United States Patent [19]
Harris et al.

[11] 3,965,211
[45] June 22, 1976

[54] CURABLE COMPOSITION OF RESIN, CYCLOALIPHATIC EPOXIDE AND AN AMINO COMPOUND

[75] Inventors: Glyn Islwyn Harris, Stourbridge, England; Brian George Huckstepp, Glamorgan, Wales

[73] Assignee: Albright & Wilson Limited, Oldbury, England

[22] Filed: Nov. 21, 1974

[21] Appl. No.: 525,952

Related U.S. Application Data

[63] Continuation of Ser. No. 453,875, March 22, 1974, abandoned, which is a continuation of Ser. No. 292,333, Sept. 26, 1972, abandoned.

[30] Foreign Application Priority Data

Oct. 1, 1971  United Kingdom............... 45825/71

[52] U.S. Cl................. 260/830 R; 260/47 EC; 428/415
[51] Int. Cl.² ............... C08G 45/06; C08G 30/16
[58] Field of Search.... 260/47 EN, 47 EC, 830 TW, 260/831, 830

[56] References Cited
UNITED STATES PATENTS

| | | | |
|---|---|---|---|
| 3,001,972 | 9/1961 | Christenson | 260/47 |
| 3,200,172 | 8/1965 | Renner | 260/831 |
| 3,493,630 | 2/1970 | Salensky | 260/831 |

FOREIGN PATENTS OR APPLICATIONS

| | | | |
|---|---|---|---|
| 2,035,484 | 12/1970 | France | |
| 1,150,203 | 4/1969 | United Kingdom | |
| 1,215,683 | 12/1970 | United Kingdom | 260/47 |

Primary Examiner—Murray Tillman
Assistant Examiner—T. Pertilla
Attorney, Agent, or Firm—Flynn & Frishauf

[57] ABSTRACT

A curable composition comprising (a) a resin containing free hydroxyl groups which is obtained by the reaction of a compound of formula $R'(CH_2X)_a$, wherein $R'$ is a divalent or trivalent aromatic hydrocarbon or a di(aromatic hydrocarbon) ether, X is an alkoxy group of 1 to 6 carbon atoms or is chlorine, bromine or iodine and $a$ is 2 or 3, with a phenolic compound, (b) a cycloaliphatic epoxy compound containing at least two 1,2 - epoxide groups per molecule and (c) an amino compound selected from the group consisting of imidazoles, N-substituted imidazoles, triethylene diamine, and benzimidazoles.

26 Claims, No Drawings

CURABLE COMPOSITION OF RESIN, CYCLOALIPHATIC EPOXIDE AND AN AMINO COMPOUND

This is a continuation of application Ser. No. 453,875, filed Mar. 22, 1974, which became abandoned after filing of this continuation application and which in turn was a continuation of application Ser. No. 292,333 filed Sept. 26, 1972 and now abandoned.

The present invention relates to curing systems for resins. In particular it relates to systems for phenolic resins. Phenolic resins which are curable in accordance with the present invention are phenol-xylylene resins obtainable by the copolymerisation of a phenol with a compound of the formula

where $a$ is 2 or 3, R' is a di or trivalent aromatic hydrocarbon radical or a di or trivalent aromatic hydrocarbonoxy radical in which the oxygen is present as an ether group and X is a halogen atom or an alkoxy radical containing less than 6 carbon atoms. Such latter resins will hereinafter be referred to as "Xylok" resins. "Xylok" is a trademark of Albright & Wilson Limited; such resins may be prepared as described in British Specification No. 1,150,203 which discloses the reaction of said R' (-CH$_2$X)$_a$ with a molar excess of said phenol to produce said resins;

The cross linking of phenol-aldehyde resins by di or polyepoxide compounds is a known technique in which it is normally desirable to employ an amino compound such as benzyldimethylamine as a catalyst. A method for cross linking of "Xylok" resins is described in U.S. Pat. No. 3,936,510 issued on Feb. 3, 1976 in which there is employed compounds having at least 2 epoxide groups in the molecule and there is suggested the use of amino compounds such a morpholinium-p-toluene sulphonate, 2,4,6 tris (dimethyl amino ethyl) phenol, benzyldimethylamine or hexamethylene tetramine as a catalyst.

We have now found that the use of a combination of particular amino compounds with particular epoxy compounds in the curing system appears to have a beneficial effect on the stability at high temperature of the cured resins. Such systems involve the use of epoxy compounds to react with active sites on the resin chain so as to result in a side chain itself containing an epoxy grouping becoming attached to the polymer molecule which are caused to crosslink by heating with certain amino compounds containing nitrogen atoms in a saturated or unsaturated heterocyclic ring.

Accordingly the present invention provides a process for curing a resin which contains free phenolic hydroxyl groups which comprises heating such a resin with a compound having at least 2 epoxy groups or heating the preformed product of the reaction of the resin and such an epoxy compound in the presence of an amino compound containing 2 nitrogen atoms in the same heterocyclic ring and at least one of them being a tertiary nitrogen atom and the other a secondary or tertiary nitrogen atom.

Normally it will be preferred to form the side chain containing an epoxy group on the resin molecule in situ when carrying out the curing reaction. In such cases the phenolic resin will be mixed with an epoxy compound containing at least two epoxide groupings in the molecule and the desired amino compound and then heated. If desired a diluent such as methyl ethyl ketone or a solvent such as a high boiling point chlorinated aromatic compounds, may also be present.

Suitable epoxy compounds for use in this invention are those of a functionality at least 2. They include those mentioned in said U.S. Pat. No. 3,936,510 such as 1,2,3,4-di-epoxybutene, 1,2,3-tri (1,2-epoxypropoxy) cycloaliphatic epoxides e.g.

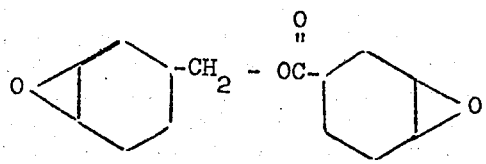

Also operative as the epoxy compounds for use according to the process of this invention are the epoxylated novolac resins both of the conventional type described in British Specification No. 1,169,045. Resins of the latter type may be prepared by reacting a phenolic polymer of the type obtainable according to step (1) of the present invention with an ephihalohydrin in the presence of an acid acceptor. However, preferred epoxy compounds for the present invention are those of the cyclo-aliphatic type, in particular those which do not contain any unbranched alkyl chains of more than three carbon atoms. Suitable compounds include 2 - (3,4-epoxy) cyclohexyl 5,5-spiro (3,4-epoxy) cyclohexane-i m-dioxane

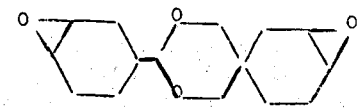

cyclopenta diene dioxide

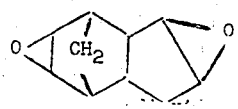

vinyl cyclohexene dioxide

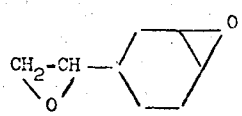

Whichever route is taken to bring about the formation of the side chain, the amount of epoxy compounds employed will be determined by the degree of crosslinking desired in the product. Useful products can be made when only 10% of the stoichiometric amount of the epoxy compound is employed. For a completely crosslinked product there will be employed at least the stoichiometric amount of epoxy compound required to react with all of the phenolic groups of the resin. We have found that the use of an excess of epoxy compound up to 10 times the stoichiometric amount may be of use in some cases more normally a 3:1 excess may be employed.

The amino compounds for use in the process of the invention are those having 2 nitrogen atoms in a heterocyclic ring. Desirably the compounds employed contain only 2 or 3 nitrogen atoms in the molecule of which at least one is a tertiary nitrogen atom and another is a secondary or tertiary nitrogen atom in the same heterocyclic ring separated by at least one carbon atom. Other nitrogen atoms which may be present are not contained in heterocyclic rings and are desirably secondary nitrogen atoms, rather than primary ones. Compounds which we have found to be particularly suitable for use as catalysts in the process of the invention are imidazole derivatives such as 1-N butyl imidazole

N propyl imidazole, N cyclohexyl imidazole and 2 ethyl 4 methyl imidazole and triethylene diamine

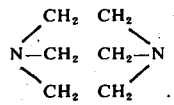

Other compounds which may be employed, however, include compounds in which the heterocyclic ring containing the nitrogen atoms is fused with a carbocyclic ring, for example benzimidazole and substituted derivatives thereof.

Whatever the amino compound employed and wherever the epoxy - containing side chain is bonded to the phenolic resin, in situ techniques being preferred the curing of the resin will be accomplished by heating prefereably to a temperature of at least 80°C. Desirably for speed of curing the cure is carried out at a temperature of from 110° to 200°C. If it is desired that in operation the cured composition will be subjected to temperatures in excess of 250°C, this being possible if the preferred epoxy compounds and the preferred amino compounds are employed in conjunction, it is desirable that a post cure heating to the desired operating temperature of at least one hour be carried out. In such curing processes the amino compound is normally present in amounts of up to 10%, preferably 0.05 to 5% by weight of the resin being cured.

The curing reaction of the phenolic resin with epoxide according to this invention may be performed employing any desired sequence of operations. Thus, for example, the phenolic material may be prepared and mixed with the catalyst, and di or polyepoxide subsequently incorporated when curing is to be effected. Alternatively, the phenolic material may be partially pre-reacted with the di or polyepoxide, with or without the presence of a catalyst, so as to give a partially cured product which may subsequently be further cured by mixing with catalyst, if none is present after the partial reaction, and heating.

Phenolic resins which may be cured by the process of the invention include not only those of the conventional phenol formaldehyde type but also "Xylok" resins derived from "phenolic compounds" and compounds of the formula R'(CH$_2$X)$_a$.

The term "phenolic compound" as employed herein in respect of reactant includes any compound or mixture of compounds derived from benzene and containing from 1 to 3, preferably one or two, hydroxyl radicals attached to the aromatic nucleus, there being at least two free nuclear hydrogen atoms per molecule, that is, at least two nuclear hydrogen atoms available for reaction. Examples of phenolic compounds for use in the process of this invention include phenol, p-cresol, resorcinol, catechol, isopropyl catechol, beta naphtol, diphenylolpropane, diphenylolmethane, alkyl phenols such as p-ethyl-phenol, p-tert-butylphenol and p-tert-octyl phenol, p-phenylphenol, m-phenylphenol, o-phenylphenol, pyrogallol, phlurogulcinol 4,4$^1$ dihydroxydiphenylsulphone and diphenylol propane. Most preferred as the phenolic compounds are those containing one or two hydroxy radicals per aromatic nucleus for example, phenol, p-phenylphenol and resorcinol.

In compounds of the formula R'(CH$_2$X)$_a$, R' is an aromatic hydrocarbon or hydrocarbon ether radical or a substituted hydrocarbon or hydrocarbon ether radical, for example the phenylene radical, diphenylene radical, the diphenylene oxide radical-

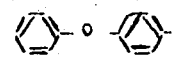

the radical

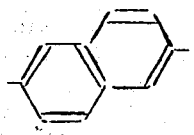

or the radical

The radical X may be any alkoxy radical containing less than six, and preferably less than four, carbon atoms, for example the methoxy, propoxy or butoxy radicals, or it may be a chlorine, bromine or iodine atom a is 2 or 3. The preferred compounds for reaction with the phenolic compounds are those in which a has a value of 2, particularly the p-xylylene dihalides, for example p-xylylene dichloride and the p-xylylene dialkylethers, for example p-xylyleneglycoldimethylether.

If desired the R' radicals may contain substituents, for example methyl radicals, attached to the aromatic nucleus provided the said substituents are inert under the conditions of the reaction. In fact the presence of chlorine or fluorine atoms in some or all of the available positions in the aromatic nucleus can be advantageous in that it leads to improved flame resistance in the resulting polymeric products. Examples of substituted aralkyl ethers and aralkyl halides which may be employed according to this invention are 2,3,5,6-tetrachloro-1,4-di (methoxy-methyl)-benzene and 2,3,5,6-tetrachloro-1,4-di (chloromethyl)-benzene.

The reaction between the phenolic compound and the aralkyl ether or aralkyl halide involves condensation of the alkoxy radicals or halogen atoms in the aralkyl compound with nuclear hydrogen atoms in the phenolic compound, and, when present, the compound containing aromatic nuclei, with the elimination of an alcohol or a hydrogen halide. Preferably the process is carried out in the presence of a suitable catalyst for this reaction, for example, acid activated ball clays, sulphuric acid, p-toluene sulphonic acid, diethyl sulphate, or a Friedel Crafts type catalyst such as stannic chloride, zinc chloride or ferric chloride. The most preferred catalysts are stannic chloride and diethyl sulphate.

The quantity of catalyst employed is not critical and from about 0.01 to about 1% by weight based on the weight of the reactants has been found to be sufficient for most purposes although up to 3% or more may be used if desired. In order to obtain reasonably short reaction times the reactants are preferably hdeated to temperatures in the range from about 130° to 200°C.

If desired organic solvents may be added to the reaction mixture for example to compatibilise the reaction components or assist in the recovery of the reaction product. Such organic solvents, if present, should preferably comprise the high boiling chlorinated aromatic compounds, with deactivated aromatic rings, for example chlorobenzene.

The present invention in addition to providing a process for curing phenolic resins also provides a curable composition comprising such a phenolic resin, an epoxy compound and an amino compound as hereinbefore defined or alternatively a phenolic resin which already has attached to it an epoxide - containing side chain. It also provides a mixture comprising suitable epoxy and amino compounds as hereinbefore described suitable for curing phenolic resins.

The process of the invention is illustrated by the following Examples:

Resorcinol (21.6 moles, 2375g), p-xylyleneglycoldimethyl ether (14.3 moles, 2380g) and diethyl sulphate (0.014 moles, 1.85 mls.) were placed in a reaction flask fitted with a condenser and the contents of the flask heated with stirring at 110° to 205°C for approximately 5 hours, during which time the theoretical amount of methanol was liberated. The reaction product was then dissolved in methyl ethyl ketone to give a 55% w/w solution. This solution was designated Resin A.

EXAMPLE 1

Resin A (248g) was mixed with a commercial diepoxide sold as Araldite CY.175 (254g) and having the formula:

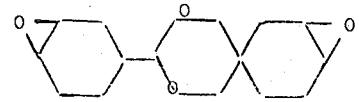

to give a mixture having an epoxy: phenolic OH ratio of about 1:1. The mixture was diluted with 154g of methyl ethyl ketone, 8.2 g of N-n-butyl imidazole was added, and the solution used to coat Marglass 7T glasscloth treated with a methacrylatosilane finish to give a resin content of 38.7%. The coated glasscloth was precured at 130°C for 10 minutes, cooled and cut into seventeen 10 inch squares which were then pressed together at 175°C for 1 hour at 500 psi. The resulting laminated board, which had a resin content of 35.5%, was postcured from 150° to 250°C. in 5 hours and then at 250°C for 24 hours, and had flexural strengths (measured in the warp direction) of 83,600 psi at room temperature, and 33,600 psi at 250°C. After heat ageing for 500 hrs. at 250°C., 63% of the room temperature and 73% of the 250°C strength was retained.

COMPARATIVE EXPERIMENT 1

Example 1 was repeated, except the 8.2g of N-n-butyl imidazole catalyst was replaced by an equivalent amount of benzyldimethylamine (18.0g). The precure temperature used in this case was 167°C, and the laminate had a resin content of 31.2%, otherwise conditions were identical. The laminate had flexural strengths of 79,000 psi at room temperature, and 28,600 psi at 250°C. However, after heat ageing for 500 hrs. at 250°C, only 17% of the room temperature and 40% of the 250°C. strength was retained.

EXAMPLE 2

Example 1 was repeated, except the 8.2g of N-n-butyl imidazole catalyst was replaced by an equivalent amount of triethylene diamine (4.6g). The precure temperature used in this case was 140°C, and the laminate had a resin content of 36.6%, otherwise conditions were identical. The laminate had a flexural strength of 84,900 psi at room temperature and 24,500 psi at 250°C. After heat ageing for 500 hrs. at 250°C, 65% of the room temperature and 98% of the 250°C. strength was retained.

COMPARATIVE EXPERIMENT 2

Example 1 was repeated, except the 8.2g of N-n-butyl imidazole catalyst was replaced by an equivalent amount of triethanolamine (19.7g). The precure temperature used in this case was 145°C, and the laminate had a resin content of 30.7%, otherwise conditions were identical. The laminate had a flexural strength of 71,700 psi at room temperature and 33,600 psi at 250°C, however after heat ageing for 500 hrs. at 250°C, only 14% of the room temperature and 12% of the 250°C strength was retained.

A sample of a commercial phenol formaldehyde novolac, known as Cellobond J2010 (Grade 3), was dissolved in an equal weight of methyl ethyl ketone to give a solution designated Resin B.

EXAMPLE 3

Resin B (304g) was mixed with Araldite CY 175 (234g) to give a mixture having an epoxy: phenolic OH ratio of about 1:1. 8.1g of N-n-butyl imidazole was added, and the solution used to coat Marglass 7T glasscloth treated with a methacrylatesilane finish, to give a resin content of 44.0%. The coated glasscloth was precured at 140°C for 10 minutes, cooled, and cut into seventeen 10 inch squares which were then pressed together at 175°C for 1 hour at 500 psi. The resulting laminated board, which had a resin content of 35.0% was then postcured for 6 hours at 120°C, followed by heating up to 250°C over 23 hours. The flexural strength of this laminate was 75,000 psi at room temperature and 17,600 psi at 250°C, and after heat ageing for 250 hours at 250°C these values had increased to 77,400 and 35,200 psi respectively.

COMPARATIVE EXPERIMENT 3

Example 3 was repeated, except the N-n-butyl imidazole was replaced by an equivalent amount of 2,4,6-tris(dimethylaminomethyl) phenol (9.6g). The precure temperature used in this case was 159°C, and the laminate had a resin content of 36.4%, otherwise conditions were identical. The flexural strength of this laminate was 70,400 at room temperature and 13,200 psi at 250°C, however after heat ageing for 250 hours at 250°C, these values were reduced to 11,000 psi and 12,900 psi respectively.

EXAMPLE 4

Example 1 was repeated, except the 8.2g of N-n-butyl imidazole was replaced by an equivalent amount of benzimidazole (7.8g). The precure temperature used in this case, was 134°C. The laminate had a resin content of 32.6% and the postcure at 250°C was only 1 hour, otherwise the conditions were identical. The laminate had flexural strengths of 62,100 psi at room temperature and 22,900 psi at 250°C. After heat ageing for 250 hours at 250°C, 84% of the room temperature strength was retained and the strength at 250°C had increased by 12%.

COMPARATIVE EXPERIMENT 4

Example 1 was repeated, except the 8.2g of N-n-butyl imidazole was replaced by an equivalent amount of diethanolamine (13.9g). The precure temperature used in this case was 151°C.

The laminate had a resin content of 30.7% and the postcure at 250°C was for only one hour, otherwise conditions were identical. The laminate had flexural strengths of 70,700 psi at room temperature and 33,350 psi at 250°C. However, after heat ageing for 250 hrs. at 250°C, only 25% of the room temperature and 26% of the 250°C strength was retained.

EXAMPLE 5

Resin A (374g) was mixed with a commercial diepoxide sold as Bakelite ERL 4221 (318g) having the formula:

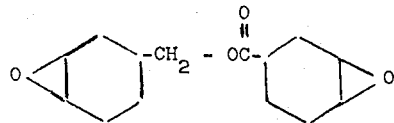

to give a mixture having an epoxy: phenolic Oh ratio of about 1:1. 8.0g of N-n-butyl imidazole was added and the solution used to coat Marglass 7T glasscloth treated with methacrylate silane finish, to give a resin content of 36.5%. The coated glasscloth was precured at 120°C for 13 minutes, cooled, and cut into eighteen 10 inch squares which were then pressed together at 175°C for 1 hour at 500 psi. The resulting laminated board, which had a resin content of 35.1% was postcured from 150 to 250°C in 5 hours, and then at 250°C for 2 hours and had flexural strengths (measured in the warp direction) of 70900 psi at room temperature and 43000 psi at 150°C. After heat ageing for 250 hours at 250°C, these values were 63600 psi and 42900 psi respectively.

COMPARATIVE EXPERIMENT 5

Example 5 was repeated, except the 8.0g of N-n-butyl imidazole was replaced by an equivalent amount of diethanolamine (13.8g). The precure temperature used in this case was 160°C and the laminate had a resin content of 31.5%, otherwise conditions were identical. The laminate had flexural strengths of 87400 psi at room temperature and 50800 psi at 150°C. However, after heat ageing for 250 hours at 250°C, only 79% of the room temperature and 95 % of the 150°C strength was retained.

We claim:

1. A curable composition comprising (a) a resin containing free hydroxyl groups which is obtained by the reaction of a compound of formula $R'(CH_2X)_a$ wherein $R'$ is a divalent or trivalent phenylene group, X is an alkoxy group of 1 to 6 carbon atoms or is chlorine, bromine or iodine, and a is 2 or 3, with a molar excess of a phenolic compound, (b) a cycloaliphatic epoxy compound containing at least two 1,2 -epoxide groups per molecule in an amount of 10 – 1,000% of the stoichiometric amount needed to react with all the phenolic groups of the resin, and (c) an amino compound being selected from the group consisting of imidazoles, and triethylene diamine, in an amount of 0.05 – 10% by weight based on the weight of the resin.

2. A composition as claimed in claim 1 wherein said cycloaliphatic epoxy compound is selected from the group consisting of

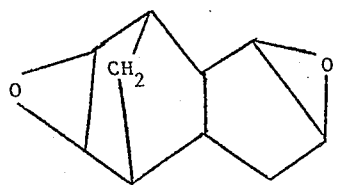

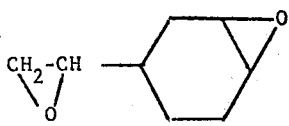

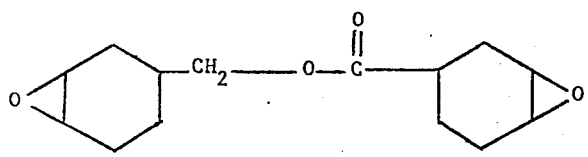

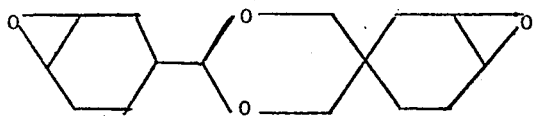

3. A composition according to claim 1 wherein the phenolic compound contains 1 or 2 hydroxyl groups attached to the aromatic nucleus.

4. A composition according to claim 3 wherein the phenolic compound contains two hydroxyl groups in the aromatic nucleus.

5. A composition according to claim 3 wherein the phenolic compound is selected from the group consisting of resorcinol and catechol.

6. A composition according to claim 1 wherein the cycloaliphatic epoxy compound is present in an amount of 1 to 10 times the stoichiometric amount required to react with all the phenolic groups of the resin.

7. A composition as claimed in claim 1 wherein the amino compound is selected from the group consisting of N-butyl imidazole, N-propyl-imidazole, N-cyclohexylimidazole, 2-ethyl-4-methyl imidazole and triethylenediamine.

8. A composition according to claim 7 wherein the amino compound is present in an amount of 0.05 – 5% by weight based on the weight of the resin.

9. A composition according to claim 1 wherein the amino compound is present in an amount of 0.05 – 5% by weight based on the weight of the resin.

10. A composition according to claim 1 wherein the compound of said formula R'(CH$_2$X)$_a$ is p-xylylene glycol dimethyl ether.

11. A composition according to claim 1 wherein R' is a phenylene group substituted by at least one methyl or halogen.

12. A composition according to claim 1 wherein said cycloaliphatic epoxy compound is

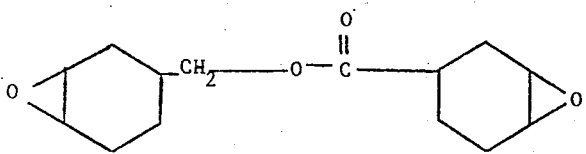

13. A composition according to claim 12 wherein the phenolic compound contains two hydroxyl groups in the aromatic nucleus and the cycloaliphatic epoxy compound is present in an amount of 1 to 10 times the stoichiometric amount required to react with all the phenolic groups of the resin.

14. A composition according to claim 13 wherein the amino compound is selected from the group consisting of N-butyl imidazole, N-propyl-imidazole, N-cyclohexyl-miidazole, 2-ethyl-4-methyl imidazole and triethylenediamine.

15. A composition according to claim 14 wherein the resin is the resin obtained by the reaction of p-xylylene glycol dimethyl ether with said phenolic compound.

16. A composition according to claim 15 wherein the amino compound is present in an amount of 0.05 – 5% by weight based on the weight of the resin.

17. A composition according to claim 1 wherein said cycoaliphatic epoxy compound is

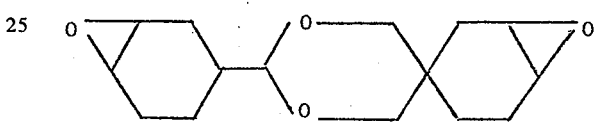

18. A composition according to claim 17 wherein the phenolic compound contains two hydroxyl groups in the aromatic nucleus and the cycloaliphatic epoxy compound is present in an amount of 1 to 10 times the stoichiometric amount required to react with all the phenolic groups of the resin.

19. A composition according to claim 18 wherein the amino compound is selected from the group consisting of N-butyl imidazole, N-propyl-imidazole, N-cyclohexyl-imidazole, 2-ethyl-4-methyl imidazole and triethylenediamine.

20. A composition according to claim 19 wherein the resin is the resin obtained by the reaction of p-xylylene glycol dimethyl ether with said phenolic compound, and wherein said phenolic compound containing two hydroxyl groups has a benzene nucleus.

21. A composition according to claim 20 wherein the amino compound is present in an amount of 0.05 – 5% by weight based on the weight of the resin.

22. A composition according to claim 20 wherein said amino compound is N-butyl imidazole.

23. A composition according to claim 20 wherein said amino compound is N-propyl imidazole.

24. A composition according to claim 20 wherein said amino compound is N-cyclohexyl imidazole.

25. A composition according to claim 20 wherein said amino compound is 2-ethyl-4-methyl imidazole.

26. A composition according to claim 20 wherein said amino compound is triethylenediamine.

* * * * *